3,414,772
DIFFERENTIAL RELAY WITH RESTRAINING MEANS RESPONSIVE TO TRANSFORMER BANK VOLTAGE
William K. Sonnemann, Roselle Park, N.J., assignor to Westinghouse Electric Corporation, Pittsburgh, Pa., a corporation of Pennsylvania
Filed June 29, 1966, Ser. No. 561,505
13 Claims. (Cl. 317—14)

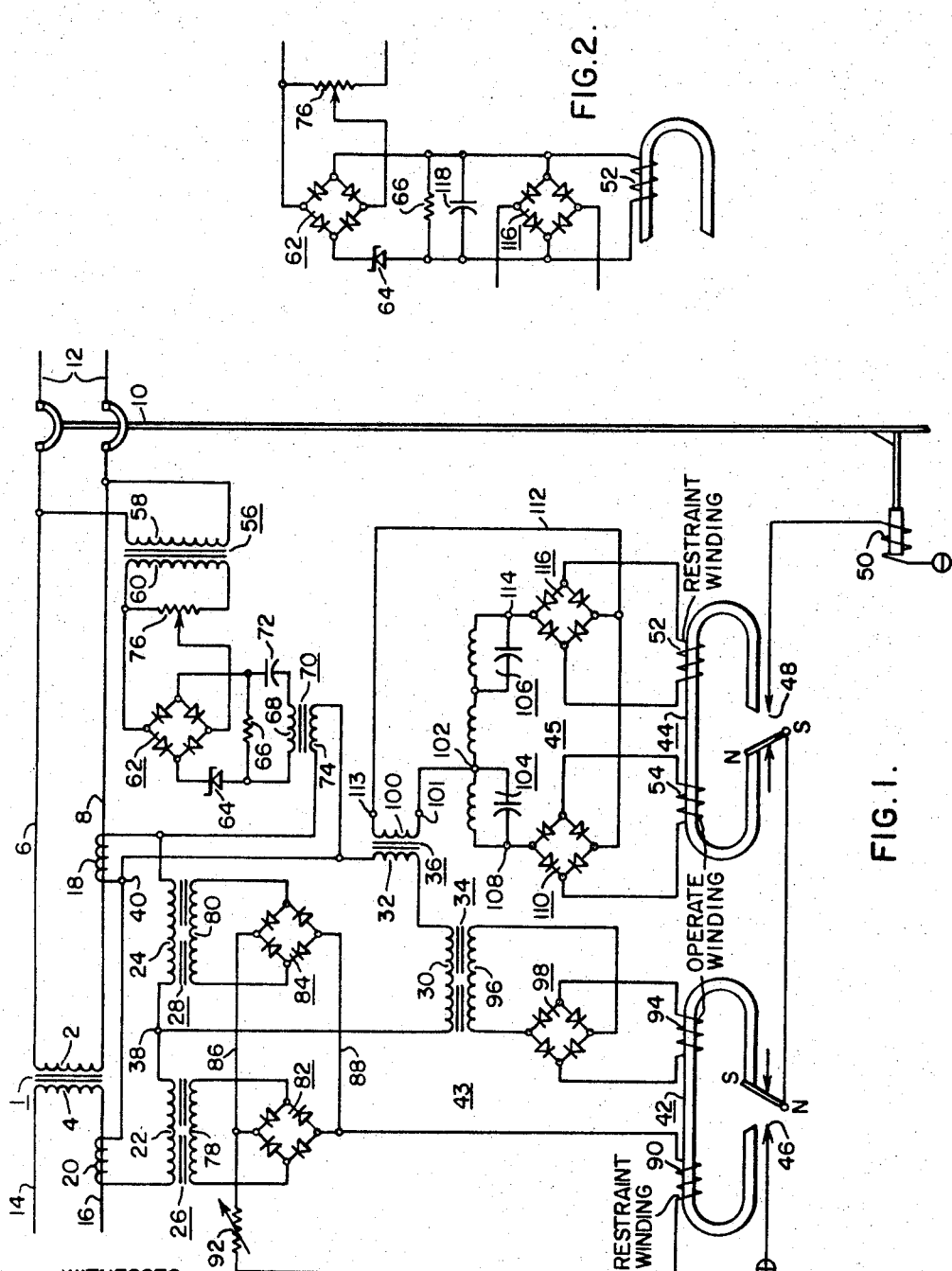
Dec. 3, 1968 W. K. SONNEMANN 3,414,772
DIFFERENTIAL RELAY WITH RESTRAINING MEANS RESPONSIVE TO
TRANSFORMER BANK VOLTAGE
Filed June 29, 1966
INVENTOR
William K. Sonneman United States Patent Office 3,414,772
Patented Dec. 3, 1968

This invention relates generally to relaying apparatus and more particularly to a differential relay for protecting against internal faults in an electrical apparatus such as a bank of transformers.

Differential relays of the type used for the protection of transformer banks sense the exciting current of the transformer bank because this exciting current is consumed within the differential zone of protection and is not reflected in the output of volt-amperes of the bank. Under conditions of operation at normal voltage, this presents no problem because the sensitivity of the differential relay is adjusted to make allowance for this difference between the input and output of the transformer bank.

There are, however, occasions when the exciting current is greater than normal as, for example, when the voltage at the transformer bank becomes much higher than normal. This increase in the exciting current occurs as the result of operating the transformer iron at higher than normal flux densities. As a rule-of-thumb, the exciting current in normal transformer banks doubles for every 10% increase in voltage above the normal design voltage of the transformer bank. Therefore, when the overvoltage becomes high enough, the large increase in exciting current which the differential relay views as an internal fault in the transformer bank may cause an undesirable trip. This increased voltage condition may be brought about by many causes one, for example, being a sudden loss of load.

One available type of differential relay is prevented from tripping in the presence of a certain percentage of current at the second harmonic frequency of the fundamental frequency. This type of differential relay is known as a harmonic-restraint relay and is very useful for preventing a tripping operation due to magnetizing inrush current but is not normally effective in the event of an overvoltage condition. This is because current at the second harmonic frequency is always present in the magnetizing inrush current when a bank of transformers is first energized but is not normally present in an overvoltage condition.

The present invention relates to a differential relay apparatus which provides a restraining signal whenever the voltage at the transformer bank exceeds a predetermined maximum critical value.

It is an object of this invention to provide a differential relay apparatus which will not trip due to increased magnetizing current caused by an overvoltage condition of the transformer bank.

A further object of this invention is to provide such an apparatus which is automatically desensitizing during overvoltage operating conditions of the protected electrical apparatus without at the same time being rendered insensitive to respond to a fault condition in the transformer bank.

Other objects will be apparent from the description, the appended claims and the drawings in which drawings:

FIGURE 1 shows diagrammatically a differential relay apparatus embodying the invention; and, FIG. 2 is a fragmentary view showing a modified form of the invention.

In describing the invention, a preferred form thereof is shown associated with a single phase transformer. It is to be distinctly understood, however, that the invention is equally applicable to polyphase transformer banks. In the event a polyphase transformer bank is to be protected, the apparatus illustrated in FIGURE 1 would be substantially duplicated for each of the phases of the polyphase network.

Referring to the drawings by characters of reference, the numeral 1 indicates generally a power transformer which is to be protected. The transformer 1 has a first winding 2 and a second winding 4. The primary winding 2 is energized from conductors 6 and 8 which are connected through the contacts of a suitable current interrupting switch or breaker 10 to a suitable source of alternating potential energy indicated generally by the conductors 12. The secondary winding 4 of the transformer 1 is connected to energize conductors 14 and 16.

Current flow into and out of the transformer 1 is sensed by means of current transformers 18 and 20 associated with the current conductors 8 and 16 respectively. The current transformers 18 and 20 are connected in series with each other through the primary windings 22 and 24 of mutual reactors 26 and 28 respectively. The primary windings 30 and 32 of mutual reactors 34 and 36, respectively, are connected between the common connection 38 of the windings 22 and 24 and the common connection 40 of the secondary windings of the current transformers 18 and 20. Mutual reactors are well known in the art and are devices which provide voltage magnitudes in the secondary winding which are proportional to the current magnitude in the primary winding.

The current transforming ratios of the current transformers 18 and 20 are selected with respect to the turns ratio of the windings of the transformer 1 such that when the volt-amperes in the primary winding 2 is exactly equal to the volt-amperes out of the secondary winding 4, the current flow through the secondary winding of the current transformer 18 is equal to the current flow through the secondary winding of the transformer 20. With this selection, no current will flow through the primary windings 30 and 32 between the common connections 38 and 40 when the volt-amperes into the transformer 1 is equal to the volt-amperes out of the transformer 1.

In the event the transformer 1 develops an internal fault, more volt-amperes will flow into the primary winding 2 than flow out of the primary winding 4. This results in more current flowing through the secondary winding of the current transformer 18 than through the secondary winding of the current transformer 20. The excess current flowing in the current transformer 18 flows through the primary windings 30 and 32 of the mutual reactors 34 and 36 between the common connections 38 and 40. This current flow through the mutual reactors 34 and 36 due to the internal fault is primarily at the fundamental frequency of voltage supplied by the conductors 12 and, as will be described below, serves to energize the polarized relays 42 and 44 of the differential unit 43 and the harmonic unit 45 respectively. When so energized, the relays 42 and 44 close their circuit controlling contacts 46 and 48 and energize a trip coil 50 of the breaker or current interrupting switch 10. Switch 10 thereupon opens its circuit controlling contacts and deenergizes the conductors 6 and 8.

When modern transformers are energized, transient currents flow thereto resulting in a gerater number of volt-amperes flowing into the transformer than flow out of the transformer even though there is no internal fault in the transformer. This transient current flows in the secondary winding of the current transformer but does not flow in the secondary winding of the current transformer 20. This transient current flows through the mutual reactors 30 and 32 in the same manner as would occur in the event of an internal fault. This unbalance current which flows immediately upon the energization of a transformer is rich in the second harmonic frequency whereby the restraint winding 52 of the polarized relay 44 is energized sufficiently with respect to the energized condition of the operate winding 54 to prevent the relay 44 from closing its contacts 48. Therefore, irrespective of any closure of the contacts 46 by the relay 42, the trip coil 50 cannot be energized to trip the breaker 10 to falsely disconnect the transformer 1 from the supply conductor 12.

If for some reason or other the voltage at the transformer 1 rises, as for example due to a sudden or severe decrease of load supplied by the transformer 1 or supplied from the source which energizes the transformer 1, the potential across the windings of the trasformer may substantially increase. Such voltage increase causes the core of the transformer 1 to operate at an increased flux density. With normally available transformers, the magnetizing current may substantially double for every 10% increase in voltage above normal voltage.

The increased magnetizing current into the transformer causes the secondary winding of the current transformer 18 to be greater than the current in the secondary winding of the transformer 20. This unbalance results in a differential current flow through the windings 30 and 32 and an increase in the output voltage of the mutual reactors 34 and 36. This unbalance or differential current is not normally rich in the second harmonic and therefore is not effective to energize the restraint winding 52 sufficiently with respect to the operate windings 54 to prevent closure of the contact 48 by the relay 44. The unbalance current will often cause the relays 42 and 44 to both become operative and close their contacts 46 and 48 causing an undesired energization of the trip winding 50. This is undesired because no internal fault exists in the transformer 1 and it should not be disconnected from the supply conductors 12.

In accordance with this invention, such an undesired energization of the trip coil 50 and resultant opening of the breaker 10 are prevented by supplying to the restraint winding 52 a current magnitude in response to the increase in voltages at the transformer 1. For this purpose, the voltage across the transformer 1 is sensed by a potential transformer 56 having its primary winding 58 connected between the conductors 6 and 8 and its secondary winding 60 connected through a full wave rectifying bridge 62 and a Zener diode 64 to energize a resistor 66 as a function of the increase in potential above the normal potential of the transformer 1. Voltages supplied to the transformer by the conductor 12 at or below the normal design magnitude will not cause the Zener diode 64 to breakover and conduct and the resistor 66 will not become energized. However, when the voltage at the transformer 1 increases to or above the normal magnitude, the Zener diode 64 will breakover and conduct during that portion of each half cycle of the alternating potential at the conductors 6 and 8 which is above the corresponding breakover voltage of the Zener diode 64 whereby the resistor 66 will be pulsatingly energized.

This pulsating energization of the resistor 66 pulsatingly energizes the primary winding 68 of a transformer 70 through a capacitor 72 to provide an output voltage in the secondary winding 74 which is at twice the frequency of the fundamental potential between the conductors 6 and 8. This is, of course, the second harmonic frequency to which the harmonic relay is sensitive. Therefore, it may now be seen that the secondary winding 74 will supply a second harmonic voltage which increases in magnitude as a function of the increase in voltage above normal voltage.

The output or secondary windings 74 of the transformer 70 is connected in series with the primary winding 32 of the mutual reactor 36 whereby the restraint winding 52 of the harmonic restraint unit is energized as a function of the increase in magnitude of the voltage between the conductors 6 and 8 above a critical voltage.

To accurately control the critical voltage at the conductors 6 and 8 which is required to breakover the diode 64 and pulsatingly energize the transformer 70, the full wave rectifier 62 is connected to the primary winding 60 by means of a potentiometer 76. By properly positioning the movable member thereof, the Zener diode 64 may be made to breakover at any desired voltage between the conductors 6 and 8.

Referring more specifically to the mutual reactors 26 and 28, the secondary windings 78 and 80 thereof are respectively connected through full wave rectifying bridges 82 and 84 to a pair of buses 86 and 88 which are connected to the restraint winding 90 of the polarized relay 42. This connection preferably includes a variable resistor 92 whereby the magnitude of the energization of the restraint winding 90 may be varied with respect to the magnitude of energization of the buses 86 and 88. With this arrangement, the potential between the buses 86 and 88 will be determined by the magnitude of the greatest output voltage across the secondary winding 78 or 80.

The operate winding 94 of the relay 42 is connected to the secondary winding 96 of the mutual reactor 34 through a full wave rectifying bridge 98, the restraint winding 90 is energized as a function of the magnitude of the larger of the output voltages of the mutual reactors 26 and 28 and the operate winding 94 is energized as a function of the magnitude of the output voltage of the mutual reactor 34. When the ratio of the unbalance current flowing through the mutual reactor 34 reaches a critical value with respect to the larger of the currents flowing through the secondary winding of the current transformers 18 or 20, the polarized relay 42 will be actuated to close its contacts 46. Conversely, if this ratio is below this critical value, the polarized relay 42 will retain its contacts 46 open. This operation is dependent upon the magnitude of the currents and is independent of their frequency.

The harmonic restraint unit 45 is energized by the output voltage of the secondary winding 100 of the mutual reactor 36 and is frequency sensitive. One terminal 101 of the secondary winding 100 is connected to a terminal 102 of a band stop filter 104 and a band pass filter 106. The free terminal 108 of the filter 104 is connected through a full wave rectifying bridge 110 and a conductor 112 to the other terminal 113 of the secondary winding 100. Likewise, the free terminal 114 of the filter 106 is connected through a full wave rectifying bridge 116 and the conductor 112 to the winding terminal 113.

The band stop filter 104 is tuned to exert its maximum impedance to the second harmonic frequency of the base frequency of the potential supplied from the conductors 12 while the band pass filter 106 is provided to exert its minimum impedance to the second harmonic frequency. Such a relationship is shown in Patent No. 3,144,590 issued to R. L. Sharp et al. dated Aug. 11, 1964. The direct current terminals of the bridge 110 are connected to the operate winding 54 while the DC terminals of the bridge 116 are connected to the restraint winding 52.

The flow of unbalance current through the primary winding 32 of the mutual reactor 36 establishes a voltage at the terminals 101 and 113 of the secondary winding 100 which is proportional to the magnitude of the current and which includes at least the major portion of the frequency components which are present in the unbalance current. As described in said Sharp et al. patent, the network 104 provides a low impedance to all frequencies except the second harmonic frequency and the network 106 provides a high impedance to all frequencies except the second harmonic frequency. If this unbalance current is substantially free of current at the second harmonic frequency, the operate winding 54 will be enabled to actuate the polarized relay 44 to close its contacts 48. If, however, the unbalanced current is rich in the second harmonic frequency, the restraint winding 52 will be sufficiently energized to restrain the polarized relay and its contacts 48 will not close even though an unbalance current flows through the winding 32.

The potentiometer 76 is adjusted so that the Zener diode 64 does not breakover and the transformer 70 is not energized at voltages between the conductors 6 and 8 below a selected magnitude. If, however, the voltage between the conductors 6 and 8 exceeds this selected magnitude, the Zener diode 64 breaks over and pulsatingly energizes the transformer 70 twice each cycle of the potential between the buses 6 and 8. The energizing circuit of the transformer 70 includes the capacitor 72 which will discharge through the primary winding 68 to provide the opposite half cycle to that developed in the secondary winding 74 when the Zener diode 64 conducts. This voltage at second harmonic frequency is illustrated as being supplied to the primary winding of the mutual inductors 36 through the inductors 34 and 24, however, it could just as well be supplied solely thereto since the energization of the mutual inductors 28 and 34 thereby is without any operable result.

The energization of the mutual reactor 36 by voltage at this second harmonic frequency energizes the harmonic restraint unit with voltage at the second harmonic frequency whereby the restraint winding 52 is energized to maintain the contacts 48 open. The open contacts 48 prevent undesired energization of the trip winding 50 and the opening of the breaker 10.

FIG. 2 fragmentarily shows a modified form of the invention. Elements corresponding to those in FIGURE 1 are designated by the same reference characters. In the form shown in FIG. 2, the transformer 70 and the associated capacitors 72 are dispensed with and the output from the resistor 66 is supplied directly to the restraint winding 52. This eliminates the necessity of converting the output of the resistor 62 into voltage at the second harmonic frequency and supplying this voltage through the band pass filter 106. If desired, FIG. 2, a capacitor 118 may be added in shunt with the resistor 66 to provide more stability in the energization of the restraint winding 52.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

What is claimed and is desired to be secured by United States Letters Patent is as follows:

1. In a protecting device, a switching apparatus comprising operate and restraint energizable control elements and circuit controlling means actuated by said elements to a first condition in response to ratios of energization of said operate element to the energization of said restraint element below a critical magnitude and to a second condition in response to the ratios of said energization above said critical magnitude, first and second pairs of input terminals, a network connected to both of said pairs of terminals and including a pair of output terminals energized with a first electrical quantity having a magnitude which is a function of the difference in magnitude of a pair of electrical input quantities supplied to said pairs of input terminals, a first circuit connecting said operate element to said output terminals for energizing said operate element as a function of the magnitude of the said first electrical quantity, a third pair of input terminals, and a second circuit connecting said restraint element to said third pair of input terminals for energizing said restraint element by a control electrical quantity supplied to said third pair of input terminals, said second circuit including a magitude sensing device, said magnitude sensing device being effective to prevent energization of said restraint element by said control quantity at magnitudes below a predetermined critical magnitude and to permit energization of said restraint element at magnitudes above said critical magnitude.

2. The combination of claim 1 in which there is provided first and second current transformers, each said transformer having first and second windings, said second windings of said first and second transformers being individually connected to said first and second pairs of input terminals, said input quantities being current quantities, said first quantity being a potential quantity.

3. The combination of claim 2 in which there is provided a translating device having input and output connections, said first winding of said first transformer being connected in series with said input connections, said first winding of said second transformer being connected in series with said output connection, means connecting said third pair of input terminals to one of said connections of said translating device for energization as a function of the magnitude of the potential at said one connection.

4. In a protecting device for an energized electrical apparatus having input and output connections, first and second switching units, each said unit having an operate and a restraint control element and circuit controlling contacts actuated to a first condition in response to the occurrence of a predetermined ratio of energization of its said operate element with respect to its said restraint element, first network means connecting said restraint element of said first unit to one of said connections for energization of said restraint element of said first unit as a function of the current flow in said one connection and connecting said operate element of said first unit to said connections for energization of said operate element of said first unit as a function of the difference in magnitude of the current in said connections, second network means connecting said elements of said second unit to said connections for energization of said elements of said second unit as a function of said difference current, said second network means including current proportioning means connected to said restraint element of said second unit, said current proportioning means being effective to attenuate the current flow to said restraint element of said second unit which occurs at a first frequency, and to permit the flow to said restraining element of said second unit which occurs at a second frequency, and a third network means interconnecting said restraint element of said second unit and a first of said connections, said third network means being effective to energize said restraint element solely when the potential at said first connection is above a predetermined critical magnitude.

5. The combination of claim 4 in which said third network means includes said current proportioning means and also includes means for generating a potential at said second frequency when the potential at said first connection is above said critical magnitude.

6. The combination of claim 4 in which said second frequency is two times said first frequency, said current proportioning means is a filter tuned to attenuate said first frequency and to pass said second frequency.

7. The combination of claim 6 in which said third network means includes said filter and also includes means for generating a potential at said second frequency when the potential at said first connection is above said critical magnitude.

8. The combination of claim 7 in which said filter attenuates all frequencies except those substantially at said second frequency, said second network means includes a second filter, said second filter being tuned to attenuate current flow to said operate element of said first unit which occurs at said second frequency.

9. In a device for protecting an alternating potential energized apparatus having input and output connections, first and second relays, each said relay having an operate and a restraint winding and contacts actuated to a circuit closed condition solely when the ratio of the energization of its said operate winding with respect to its said restraint winding is above a predetermined control magnitude, first voltage establishing means connected to said input connections and energized by the current flow therein, said means establishing a first potential having a magnitude which is a function of the magnitude of said current flow in said input connections, second voltage establishing means connecting said output connections and energized by the current flow therein, said second means establishing a second potential having a magnitude which is a function of the magnitude of said current flow in said output connection, third means connecting said first and second voltage establishing means to said restraint winding of said first relay, fourth voltage establishing means connected to said input and said connections and energized by a difference current, said difference current having a magnitude which is proportional to the difference in magnitudes of the current in said input and said output connections, said fourth means establishing a third potential having a magnitude which is a function of the magnitude of said difference current, fifth means connecting said fourth voltage establishing means to said operate winding of said first relay, a sixth voltage establishing means connected to said input and said output connections and energized by said difference current, said sixth establishing means establishing a fourth potential having a magnitude and frequency components which are a function of the magnitude and frequency of said difference current, first and second networks, seventh means connecting said sixth potential establishing means to said operate winding of said second relay, and including said first network, said first filter being effective to attenuate current flow therethrough, at a first frequency, eighth means connecting said sixth potential establishing means to said restraint winding of said second relay and including said second network, said second network being effective to attenuate current flow therethrough at a second frequency, said first frequency being a harmonic frequency of said second frequency, ninth potential establishing means connected to one of said connections and effective to establish an output voltage solely when the magnitude of the potential of said one connection is above a critical value, and tenth means connecting said ninth establishing means to said restraint winding of said second relay.

10. The combination of claim 9 in which the potential established by said ninth establishing means is at said first frequency and said tenth means includes said second filter.

11. The combination of claim 9 in which said first frequency is the second harmonic frequency of said second frequency.

12. The combination of claim 9 in which the connections between said first and second establishing means and said third means provides a voltage to said third means which is a function of the higher voltage of the output voltage of said first and said second voltage establishing means.

13. The combination of claim 12 in which said connection includes a rectifying means for rectifying the output potential of each of said first and second establishing means and means connecting the output potential of said rectifying means in parallel circuit connections, said tenth means including a rectifying means energized by the potential established by said ninth potential establishing means to establish a supply source of potential for said restraint winding of said second relay.

References Cited
UNITED STATES PATENTS

| | | | |
|---|---|---|---|
| 2,920,242 | 1/1960 | Koss | 317—32 |
| 2,973,460 | 2/1961 | Calhoun | 317—49 |
| 3,218,516 | 11/1965 | Sharp | 317—14 |
| 3,240,998 | 3/1966 | Sonnemann | 317—32 |
| 3,275,889 | 9/1966 | Sharp et al. | 317—49 |

LEE T. HIX, *Primary Examiner.*

R. V. LUPO, *Assistant Examiner.*